United States Patent
Lint et al.

(10) Patent No.: US 7,426,648 B2
(45) Date of Patent: Sep. 16, 2008

(54) GLOBAL AND PSEUDO POWER STATE MANAGEMENT FOR MULTIPLE PROCESSING ELEMENTS

(75) Inventors: Bernard J. Lint, Mountain View, CA (US); Todd A. Dutton, Southborough, MA (US); Kushagra Vaid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 10/956,203

(22) Filed: Sep. 30, 2004

(65) Prior Publication Data

US 2006/0069936 A1    Mar. 30, 2006

(51) Int. Cl.
G06F 1/26 (2006.01)
G06F 1/32 (2006.01)

(52) U.S. Cl. .................. 713/320; 713/300; 712/228; 709/223

(58) Field of Classification Search ............... 713/300, 713/320; 712/228; 709/223
See application file for complete search history.

(56) References Cited

U.S. PATENT DOCUMENTS

| 2002/0007463 | A1* | 1/2002 | Fung | 713/320 |
| 2003/0093655 | A1* | 5/2003 | Gosior et al. | 712/228 |
| 2004/0107273 | A1* | 6/2004 | Biran et al. | 709/223 |

OTHER PUBLICATIONS

U.S. Appl. No. 09/551,462, filed Apr. 18, 2000, "Wireless Video Distribution."
U.S. Appl. No. 10/621,228, filed Jul. 15, 2003, "A Method, System, and Apparatus for Improving Multi-Core Processor Performance."
U.S. Appl. No. 10/741,641, filed Dec. 19, 2003, "Methods and Apparatus to Manage System Power and Performance."
U.S. Appl. No. 10/750,256, filed Dec. 29, 2003, "Methods and Apparatus to Selectively Power Functional Units."
U.S. Appl. No. 10/811,864, filed Mar. 30, 2004, "Device, System and Method for Reduced Power Consumption."
U.S. Appl. No. 10/850,775, filed May 21, 2004, "P-State Feedback to Operating System with Hardware Coordination."
U.S. Appl. No. 10/859,656, filed Jun. 2, 2004, "Packet Exchange for Controlling System Power Modes."
U.S. Appl. No. 10/859,892, filed Jun. 2, 2004, "Hardware Coordination of Power Management Activities."
U.S. Appl. No. 10/880,976, filed Jun. 29, 2004, "Power Management Apparatus, Systems, and Methods."
U.S. Appl. No. 10/884,359, filed Jul. 2, 2004, "An Apparatus and Method for Heterogeneous Chip Multiprocessors via Resource Allocation and Restriction."

* cited by examiner

*Primary Examiner*—Thomas Lee
*Assistant Examiner*—Jaweed A Abbaszadeh
(74) *Attorney, Agent, or Firm*—David P. McAbee (57) ABSTRACT

A method and apparatus for global and local power management is herein described. Hardware within monitor/receives power management requests for any number of processing elements and adjusts global performance resources to change the global power state of all the processing elements or adjusts a local performance resource for a processing element to operate that processing element at a pseudo power state within the global power state.

25 Claims, 6 Drawing Sheets

GLOBAL AND PSEUDO POWER STATE MANAGEMENT FOR MULTIPLE PROCESSING ELEMENTS

FIELD

This invention relates to the field of computer systems and, in particular, to power management for multiple processing elements.

BACKGROUND

Typically, power management for a single processor on a single die has constituted changing global power states by altering global performance resources supplied to the single die, such as voltage and frequency. Therefore, when a processor is performing in a max performance/power state, the max voltage and frequency is supplied to the processor. To change the power state of the processor the frequency, voltage, or both are changed to effectuate the power state change. Other methods of power management have included reducing power to functional units of a microprocessor depending on whether the functional unit will be speculatively used to execute instructions in a cache, such as in co-pending application 750,256.

However, advances in semi-conductor processing and logic design have permitted an increase in the amount of logic that may be present on integrated circuit devices. As a result, microprocessor configurations have evolved from a basic single processor on a single die to include multiple processor cores or multiple processor threads on a single die.

Typically, multiple threads share common data caches, instruction caches, execution units, branch predictors, control logic, bus interfaces, and other processor resources, while maintaining a unique architecture state for each processor. One example of multi-threading technology is Hyper-Threading Technology (HT) from Intel® Corporation of Santa Clara, Calif., that enables execution of threads in parallel using a signal physical processor. HT is achieved by having multiple architectural states that share one set of caches, execution units, branch predictors, control logic, and buses.

In addition, multi-core technology tends to include multiple core processors on a single die. Each core may have its own caches, execution units, branch predictors, control logic, and architecture states. Yet, each core may also share some of those processing resources, as well as other resources, such as a bus interface. Multi-threads and multi-cores tend to overlap in that any configuration of multiple processors on a single die may share some resources, while having their own separate processing resources.

In fact, it is common for an operating system to logically view a multi-core single die processor and a multi-threaded single die processor exactly the same: as multiple processors. Therefore, a single die processor with either multiple cores or multiple threads are typically referred to as a physical processor having multiple "logical processors", wherein each logical processor may be a thread or a core. Moreover, the operating system may issue an independent power management request for any single logical processor on the physical processor, since the operating system may not differentiate between physical and logical processors.

Therefore, with the advent of logical processors the coarse-grained control of global resource power management may affect both power consumption and processor performance. As a simple example, if a physical processor has two logical processors running at a max performance power state and the operating system requests one of the two logical processors to enter a lower performance power state, then with the current global power management controls, there may be only two options. First, either the voltage or frequency may be reduced. However, since global performance resources, such as voltage and frequency, are supplied to the whole physical processor, both logical processors would be affected by the reduction instead of just the single logical processor. Second, the request for one of the processors to enter into a lower performance power state may be ignored. Yet, this would result in both logical processors operating at max performance, which may waste power. Furthermore, hardware speculation of future units to be utilized to reduce power to functional units, as mentioned above, may not allow the operating system to modify performance of individual logical processors.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific numbers of physical and logical processors, specific processing resources shared or separated in a physical processor, and specific power states in order to provide a thorough understanding of the present invention. It will be apparent, however, to one skilled in the art that these specific details need not be employed to practice the present invention. In other instances, well known components or methods, such as specific hardware and software implementation have not been described in detail in order to avoid unnecessarily obscuring the present invention.

The method and apparatus described herein are for efficiently managing both global and local performance resources for physical and logical processors. It is readily apparent to one skilled in the art, that the method and apparatus disclosed for adjusting performance resources may be implemented in any level computer system (personal digital assistants, mobile platforms, desktop platforms, and server platforms), as well as any number of processors. For example, a multiprocessor system with four or more physical processors may use the method and apparatus herein described to manage the global performance resources for each of the four physical processors and to manage the local performance resources for any logical processor present on the four physical processors. Additionally, a multiple server system may utilized the method herein described for adjusting local performance resources that affect an individual server in the multiple server system and for adjusting global performances that affect all of the servers in the system.

Figure 1:
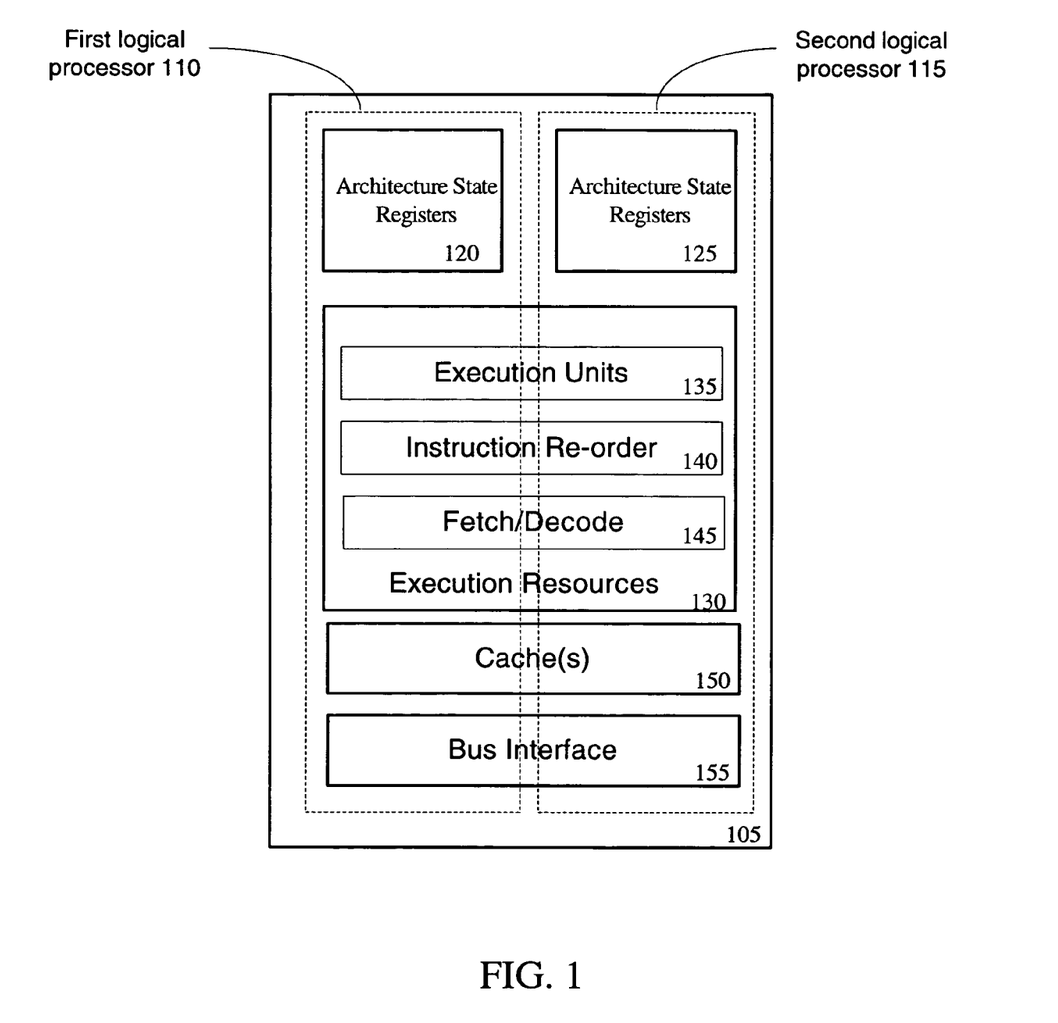
FIG. 1 illustrates an embodiment of a multi-threaded processor.

FIG. 1 illustrates an embodiment of a physical processor 105 having two logical processors: first logical processor 110 and second logical processor 115. Physical processor 105 may be any combination of transistors, circuits, and logic for processing data and/or instructions. Processor 105 may include execution resources 130, caches 150, and bus interface 155. Processor 105 may also include any combination of the following, which are not specifically depicted: a data path, and instruction path, a memory management unit, branch predictors, control logic, interrupt controllers, advanced programmable interrupt controllers (APICs), or any other circuits to process data.

Execution resources 130 may include execution units 135, instruction re-order logic 140, fetch and decode logic 145, and any other circuits to operate on data or execute instructions. Execution units 135 may include any number of arithmetic logic units (ALUs), floating-point units (FPUs), register files, operand registers, or other execution logic. Execution units 135 may also be configurable to operate on multiple data operands in serial or parallel. Furthermore, execution units 135 may be able to execute a single instruction or multiple instructions on single or multiple data operands in serial or parallel. Instruction re-order logic 140 may include any logic, registers, or circuits to receive and/or re-order instructions to be executed by execution units 135. Fetch/decode logic 145 may include circuits to fetch and decode elements, such as instructions and data operands for execution by execution units 135. Fetch/decode logic 145 may be able to fetch and decode instructions, of fixed or variable length, and/or x86 instructions.

Caches 150 may include low level data and instruction caches, secondary or higher level data or instruction caches, as well as other temporary storage for a microprocessor. Bus interface 155, and 285 in FIG. 2, may include any number of controllers or control logic for interfacing with a front-side bus, a back-side bus, a direct memory access bus, or any other external interconnect As depicted in FIG. 1, architecture state registers 120 and 125, which are associated with first logical processor 110 and second logical processor 115 respectively, share access to execution units 135, instruction re-order logic 140, fetch/decode logic 145. In another embodiment architecture state registers 120 and 125 share access to execution units 135 and fetch/decode logic 145; however, instruction re-order logic 140 is partitioned among first logical processor 110 and second logical processor 115. Architecture state registers 120 and 125 may maintain a complete set of the architecture state for first logical processor 110 and second logical processor 115, respectively. The architecture state may consist of general-purpose registers, control registers, APIC registers, machine state registers (MSRs), the state of the instruction pointer, and any other registers, logic, or circuits to maintain the architecture state of a processor or to resume execution of an interrupted thread.

Figure 2:
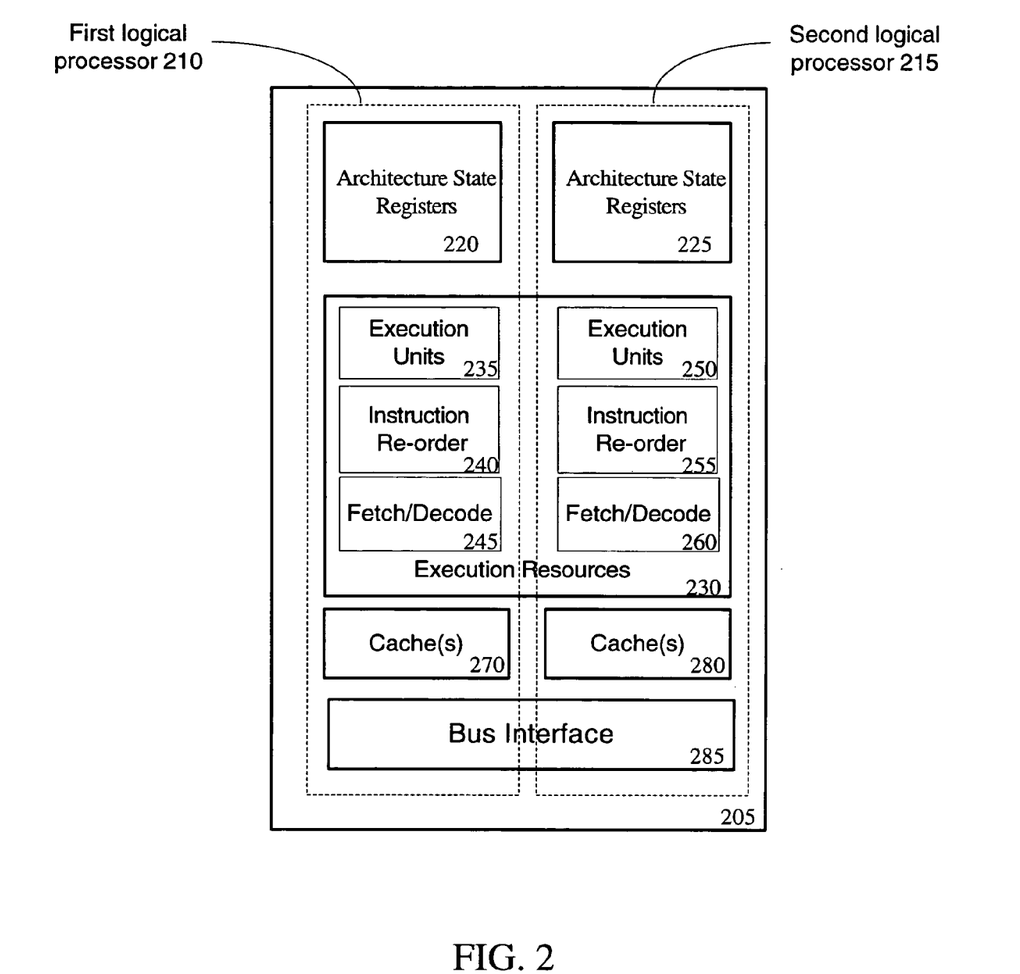
FIG. 2 illustrates an embodiment of a multi-core processor.

Turning to FIG. 2, another embodiment of a physical processor with two logical processors is shown. Physical processor 205 comprises two logical processors: first logical processor 210 and second logical processor 215. Architecture state registers 220 are associated with first logical processor 210, while architecture state registers 225 are associated with second logical processor 215.

In contrast to FIG. 1, first and second logical processors 210 and 215 do not share access to execution resources 230 and caches 270. Execution resources 230 depict execution units 235, instruction re-order logic 240, and fetch/decode logic 245 associated with first logical processor 210, while execution units 250, instruction re-order logic 255, and fetch decode logic 260 are depicted as associated with second logical processor 215. Execution units 235 and 250, instruction re-order logic 240 and 255, and fetch/decode logic 245 and 260 may include any number of transistors, circuits, logic, or registers described above in reference to FIG. 1. These blocks may be physically separate in processor 205, physically contiguous and associated with first and second logical processors 210 and 215, or a single functional block, as shown in FIG. 1, with a portion dedicated to first logical processor 210 and a portion dedicated to second logical processor 215.

Both FIGS. 1 and 2 depict at least a first set of architecture state registers associated with a first logical processor and a second set of architecture state registers associated with a second logical processor. The ability for each logical processor to maintain a separate architecture state potentially allows an operating system to view one physical processor as a plurality of processors. As a consequence, an operating system may not differentiate between a thread and a core.

Therefore, a logical processor, as used herein, includes any logic located on an integrated circuit capable to store an architecture state. As an example, a single physical microprocessor may have one set of architecture state registers capable of storing an architecture state. Consequently, the single physical microprocessor may be referred to as having one logical processor. A thread, as used herein, refers to any logic capable to store an architecture state that shares access to at least one execution unit and one cache. A core refers to any logic capable to store an architectures state that has at least a portion of the execution resources dedicated to the core. It is readily apparent from FIGS. 1 and 2 that any number of separate architecture state registers and, therefore, logical processors may be present on a physical processor. Furthermore, there may any number of physical processors, as well as any number of processing elements. A processing element may be a logical processor, a physical processor, a single computing system, a server, a network of computers, or any level element for operating on data.

Figure 3:
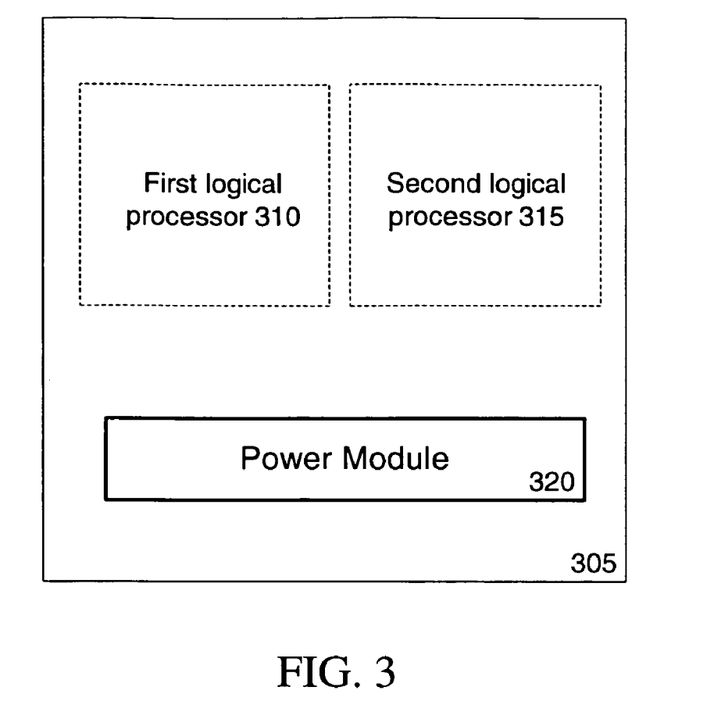
FIG. 3 illustrates an embodiment of a physical processor with two logical processors and associated firmware.

Referring to FIG. 3, a physical processor 305 is shown having first logical processor 310, second logical processor 315, and power module 320. Any number of logical processors may be present on physical processor 305; however, as to not obscure the invention only a single physical processor having two logical processors is illustrated in FIG. 3. Power Module 320, which may be only hardware as well as hardware associated with software, is depicted as associated with physical processor 305, first logical processor 310, and second logical processor 315. Power Module 320 may be integrated in physical processor 305, present on physical processor 305, or separate from physical processor 305. Power Module 320 will be discussed in more detail in reference to FIG. 4.

Since an operating system may view each logical processor, such as logical processors 310 and 315, as separate processors, the operating system may send individual power management requests (also know as commands) for each logical processor to change power states or performance levels. A power management request/command may request any level of processing element, a single physical processor, multiple physical processors, multiple logical processors, or a single logical processor to operate at a certain power or performance state. However, current methods of adjusting global resources based on an individual power management request/command may result in wasted power consumption or limiting performance. Therefore, power module 320 may be operable to receive the independent power management requests and based on those power management requests, the current power state of each processing element, or the combination of the power management requests and the current power state, power module 320 may also be operable to adjust performance resources. In one embodiment, performance resources include global resources, which are resources that affect a plurality of processing elements, such of all logical processor located on a single physical processor, and/or local resources, which are resources that affect the performance/power of a single processing element, such as a single logical processor. More detail of the adjustment of global and local performance resources will be discussed in reference to FIG. 5.

Power module 320 may be any hardware, any software associated with the hardware, any microcode, or firmware for receiving power management requests and adjusting performance resources based on those power management requests. Power module 320 may also receive power management requests an elect not to adjust performance resources either in contrast or conformance with the power management request. For example, if the power management request requests a logical processor to operate in its current power state, there would be no need for a change. As another example, power module 320 may be designed to violate the performance power management requests and not alter performance resources based on predetermined rules and dependencies.

Figure 4:
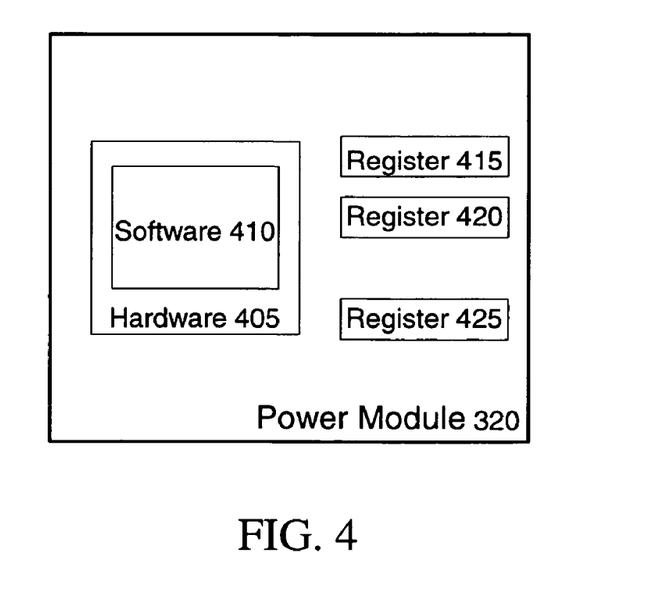
FIG. 4 illustrates an embodiment of the firmware shown in FIG. 3.

An embodiment of power module 320 is depicted in FIG. 4. In one embodiment, power module 320 comprises hardware 405 with software 410 and registers 415, 420, and 425. Hardware 405 may be any hardware device to store and/or execute software routines, such as a read access memory (RAM), a read only memory (ROM), a programmable read only memory (PROM), an erasable programmable read only memory (EPROM), an electrically erasable programmable read only memory (EEPROM), as programmable logic array (PLA), logic present in microprocessor 305, or any other circuit/memory for storing software 410. Hardware 405 may be inaccessible to users (locked), may be modifiable by special privilege users, or may be fully modifiable by any user.

Software 410 may be embedded software in hardware 405. Software 410 may also be microcode programmed in hardware 405. Software 410 may include routines or microinstructions to receive power management requests, to store the power management requests or values based on the power management requests in registers 415, 420, and 425, and/or to adjust global and/or local performance resources. Software 410 may adjust global and/or local performance resources by issuing a request for the adjustment, by actually adjusting the performance resources itself, or by communicating with a device to adjust the performance resource. Software 410 may ascertain what global or pseudo power state logical processor 310 and logical processor 315 is in by the latest request stored in registers 415-425 or by directly communicating with first and second logical processors 310 and 315.

Registers 415, 420, and 425 may store the power management requests, any value based on the power management requests, any representation of the power management requests, or the current power state of logical processors 310 and 315. There may be any number of registers 415, 420, and 425. As a very basic example, there may be one register for every logical processor to store the current power state, the latest power management request, or a value based on the latest power management request, which may represent the current power state.

As another simple example, if first logical processor 310 and second logical processor 315 are in a max performance power state, which will be referred to as P0 for this example, and first logical processor 310 receives an individual power management request to change to a lower performance power state, which for this example will be referred to as P1, then Power Module 320 may check any one, any combination, or all of registers 415-425 and discover that the last power management request for both logical processors 310 and 315 was for power state P0. Power Module 320 may then adjust local performance resources of first logical processor 310 to operate first logical processor 310 in a pseudo power state within global power state P0. Therefore, first logical processor 310 may step down in power consumption; however, second logical processor 315 has the global performance resources available to operate in the max performance power state P0. In contrast, if Power Module 320 were not present or not utilized, global performance resources, such as voltage or frequency, may have been adjusted forcing both first and second logical processors to operate at power state P1. As a consequence, second logical processor 315, which was not requested to operate in a lower power state, may be forced to operate in that lower power state P1, limiting performance.

Figure 5:
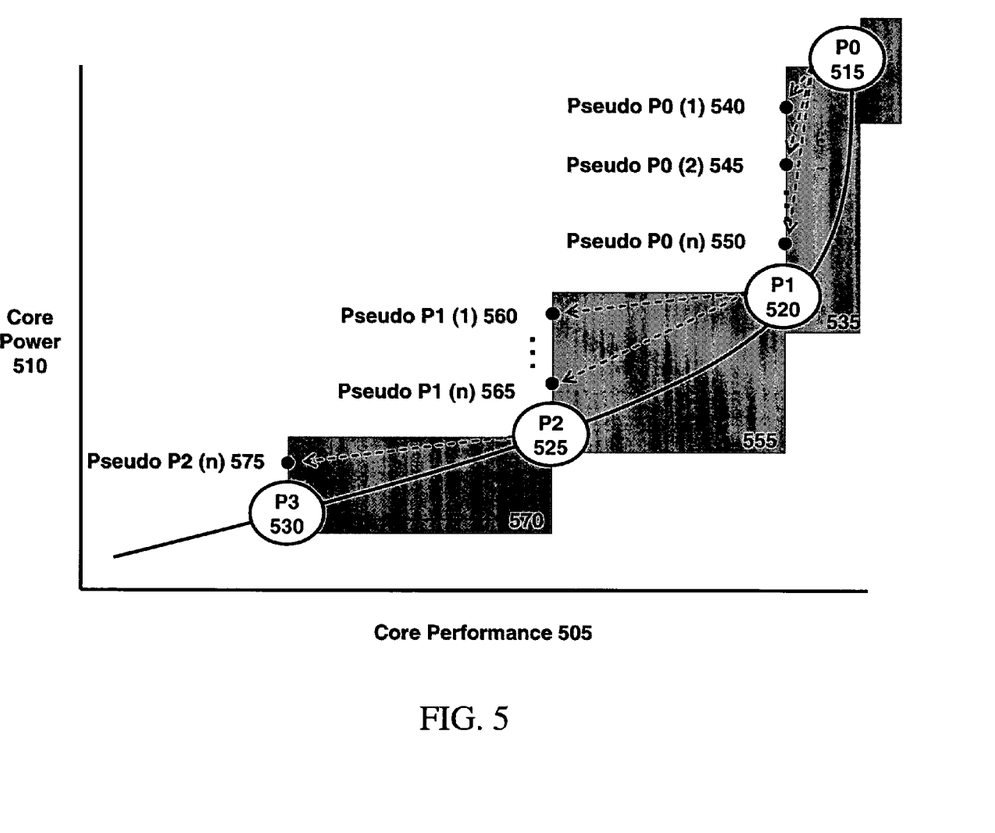
FIG. 5 illustrates an embodiment of global and pseudo power states on a core performance v. core power graph.

Turning to FIG. 5, an embodiment of global and pseudo power states on a core performance v. core power graph is shown. Once again, the two logical processors from FIG. 3 will be used to describe the graph in FIG. 5. However, any number of logical processors may be actually present on any number of physical processors. FIG. 5 illustrates four global power states: global power state 515 (P0), global power state 520 (P1), global power state 525 (P2), and global power state 530 (P3). Although, there are only four global power state illustrate in FIG. 5, there may be any number of global power states. Global power states 515-530 may be any level of power on core power axis 510 and any level of performance on core performance axis 505. A change between global power states may include adjusting global performance resources, such as voltage supplied to physical processor 305, frequency that physical processor 305 operates at, a combination of voltage and frequency, or any global resource that would affect the performance of all logical processors located on one physical processor. As an example, in global power state 515 an operating voltage may be 1.4V and a core frequency may be 3.4 GHz, which may be multiplied from an externally supplied lower frequency. To operate both logical processors at global power state 520, the operating voltage may be adjusted to 1.3V and the supplied frequency may be adjusted so that the multiplied core frequency is 2.4 GHz.

Within global power state 515 there are n pseudo power states shown including pseudo power state 540, pseudo power state 545, and pseudo power state 550. Within global power state 520 there are n pseudo power states shown including pseudo power state 560 and pseudo power state 565. Within global power state 525 there are n pseudo power states shown. Global power state 530 may also have n pseudo power states, which are not depicted in FIG. 5.

A pseudo power state may be a power state within a global power state, in which the global performances resources of the global power state are available to a single processing element, such as a logical processor; however, the single processing element is consuming less power operating in the pseudo power state than if it were operating in the global power state. To operate a logical processor in a pseudo power state any number of local performance resources may be adjusted.

For example for a logical processor, the width of instructions fetched and decoded, the number of instructions per cycle fetched and decoded, the number of data operands operated on, the width of the data operands operated on, the duty cycle, the size of the renaming pool, or any other performance resource that may affect only a single logical processor on a physical processor may be adjusted. Additionally, if voltage and frequency are independently supplied to logical processors on a single physical processor, then voltage and frequency may be local performance resources that may be adjusted. As an example for a plurality of servers as processing elements, a local performance resource may be a resource that affects only one of the plurality of servers, such as the voltage supplied by a single power supply to one of the plurality of servers.

Referring to FIG. 3-5 a few examples of how Power Module 320 may monitor independent power management requests and adjust performance resources based on those independent power management requests will be discussed.

As a first example, assume that based on a previous power management command, second logical processor 315 is operating at global power state 515. Power Module 320 may receive an independent power management command for first logical processor 310 to operate at global power state 520. Power Module 320 may check a previous power management command in a register, such as registers 415-425, to ascertain the current operating power state of second logical processor 315. Power Module 320 may also directly communicate with second logical processor 315 to ascertain its current power state.

Since the previous power management command requested second logical processor 315 to operate in global power state 515, which is a higher performance power state than global power state 520, at least one local performance resource of first logical processor 310 may be changed to operate first logical processor at pseudo power state 540. Consequently, second logical processor 315 may still be operating at global power state 515, while first logical processor 310 may be operating at pseudo power state 540. Any one or plurality of local performance resources may be changed, wherein a local performance resource affects the power consumption of a single logical processor. Power Module 320 may either randomly select or intelligently select a performance resource to change. An intelligent selection of a performance resource, may include selecting a performance resource that optimally obtains the desired power or performance level and minimizes the effects on the un-requested changes in power of performance.

It may be advantageous to design the pseudo power states, such as pseudo power state 540 to decrease power consumption and change performance to the same performance level of the requested power state. As shown in FIG. 5, all the pseudo power states within the global power states are at the same performance on the core performance axis 505 as the next lower performance power state. This may allow a logical processor to perform at the next lower performance global power state, while the global performance resources are still at the higher performance power state. Pseudo power state, such as pseudo power state 540, may be designed so that a change in any single or multiple local performance resources may be necessary to operate at that pseudo power state. However, pseudo power states are not so limited. As stated above a power management request may request a change in performance level or power state; therefore, pseudo power states, such as pseudo power state 540 may be designed to operate at any performance level on performance axis 505.

Continuing the example from above, Power Module 320 may then receive a power management command requesting first logical processor to operate at global power state 525. Power Module 320 may then check and determine that second logical processor 315 is still operating at global power state 515. Since second logical processor 315 is still operating at a higher performance power state, Power Module 320 may change or request a change to at least one local performance resource of first logical processor 310 to operate at second pseudo power state 545 within global power state 515. After the change, first logical processor 310 may be operating in second pseudo power state 545 and second logical processor 315 may still be operating in global power state 515. There may be any number of pseudo power states within each global power state. Additionally, FIG. 5 illustrates second pseudo power state 545 at the same performance on core performance axis 505, as global power state 520. However, second pseudo power state, in the continued example, may be aligned on core performance axis 505 with global power state 525, any other global power state, or not aligned with a global power state at all.

To further continue the example from above, Power Module 320 may next receive a power management command requesting second logical processor 315 to operate at global power state 525. Once again Power Module 320 may check and determine that the previous power management command for first logical processor 310 and the current power management command for second logical processor 315 have requested both first and second logical processors 310 and 315 to operate at the same global power state, global power state 525. As a result, the changes to local performance resources for logical processor 310 may be removed and at least one global performance resource, such as voltage or frequency, may be changed to operate both first and second logical processors 310 and 315 at global power state 525.

Next, Power Module 320 may receive a power management request/command requesting first logical processor 310 to operate at global power state 520. Power Module 320 may check the previous power management command for second logical processor 315. Since the latest power management command for second logical processor 315 requested second logical processor 315 to operate in global power state 525, which is a lower performance power state than global power state 520, at least one global resource may be changed so that first logical processor 310 may operate at global power state 520. In addition to changing at least one global resource, at least one local resource for second logical processor 315 may be adjusted/changed to operate second logical processor 315 in pseudo power state 560, since the latest power management command for second logical processor 315 requested second logical processor 315 to operate in global power state 525. Therefore, first logical processor 310 may operate in global power state 520, while second logical processor 315 may operate in pseudo power state 560, which may have the same performance as global power state 525.

Figure 6:
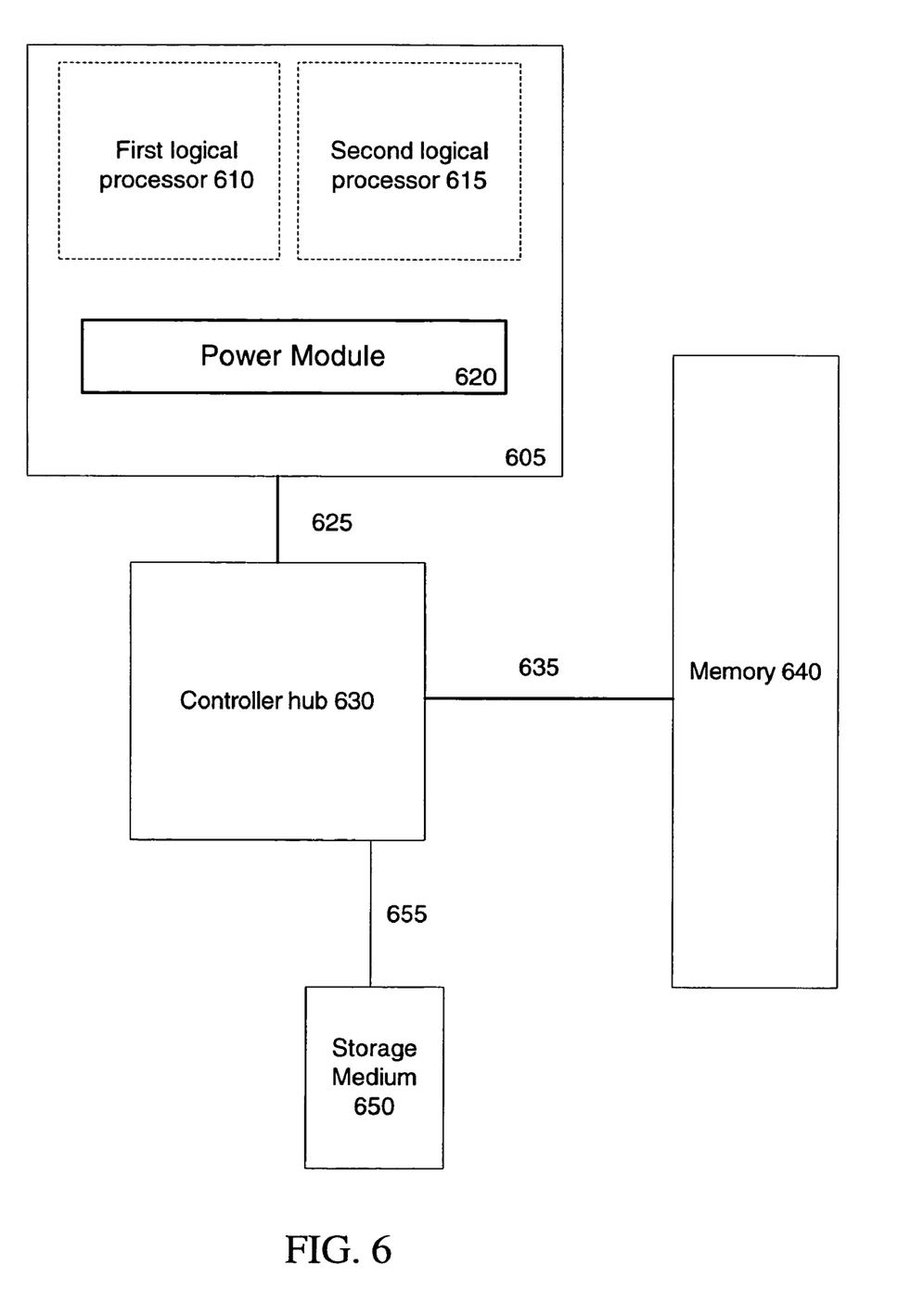
FIG. 6 illustrates an embodiment of a system with a physical processor having two logical processors and firmware, a controller hub, a memory, and a storage medium.

Referring to FIG. 6, an embodiment of a system with microprocessor 605 comprising first logical processor 610, second logical processor 615, and Power Module 620, controller hub 630 coupled to microprocessor 605 by bus 625, memory 640 coupled to control hub 630 by bus 635, and storage medium 650 coupled to controller hub 630 by interface 655. Microprocessor 605 may be a host processor capable of receiving and executing operating system (OS) code, including power management commands, stored in storage medium 655. Controller hub 630 may be a single integrated circuit or a plurality of integrated circuits coupled together. For example, controller hub 630 may comprise a first integrated circuit to interface with system memory. Controller hub 630 may also comprise a second integrated circuit coupled to the first integrated circuit to interface with storage mediums and other interfaces, such as network interfaces, user interfaces, and other interfaces, which are not depicted.

Memory 640 may load portions of OS code stored in storage medium 650 for temporary storage. The loaded portions of OS code in memory may be requested by microprocessor 605, including power management commands, which may independently request a change in power of the first logical processor 610 or the second logical processor 615.

Figure 7:
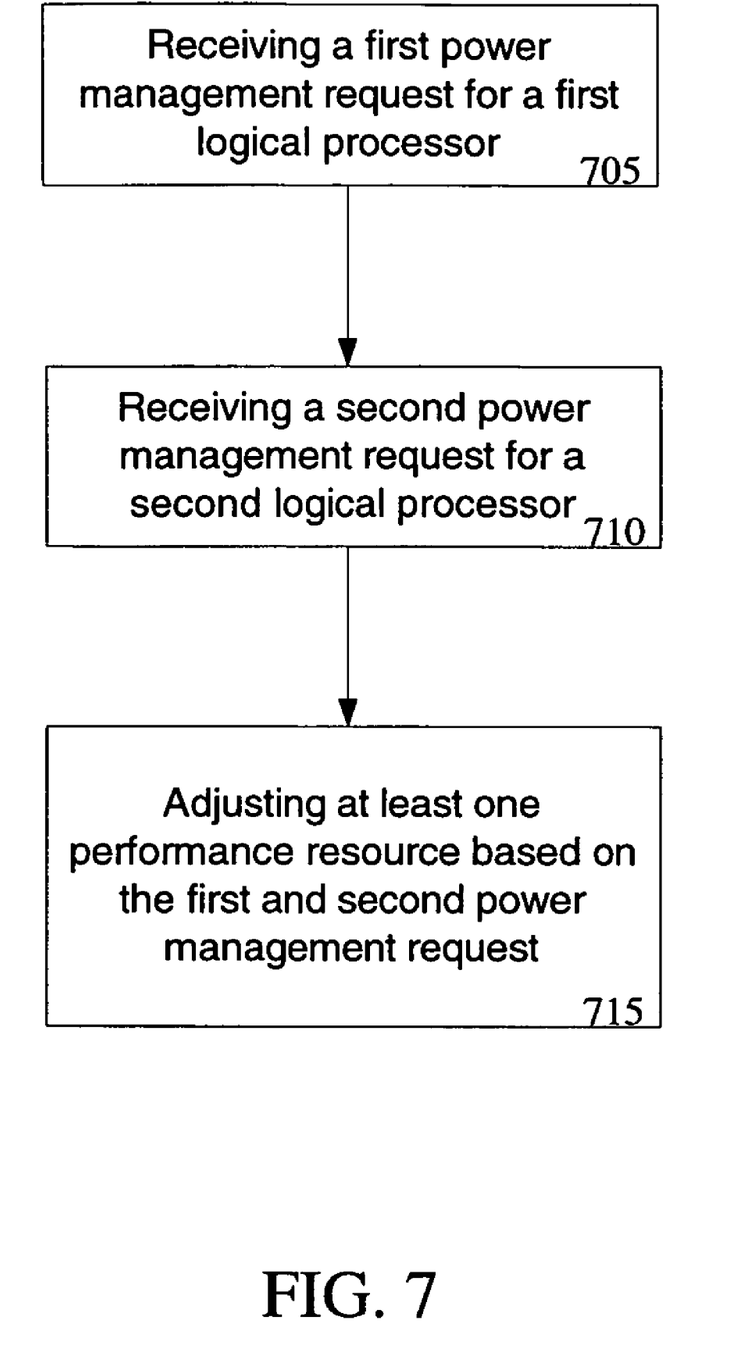
FIG. 7 illustrates a flow diagram of a method for receiving a first and a second power management request and adjusting at least one performance resource.

Turning to FIG. 7, a method for power management of two logical processors is shown. This method may include any number of logical processors. In block 705, a first power management request for a first logical processor is received. In block 710 a second power management request for a second logical processor is received. In block 715 at least one performance resource based on the first and the second power management request is adjusted. The at least one performance resource may be any global or local resources as discussed above in reference to the earlier Figures. In addition, adjusting at least one performance resource based on the first and the second power management request may include any of the aforementioned methods of checking (1) the current operating power state of logical processors or (2) the previous power management commands and adjusting either global or local performance resources accordingly.

An apparatus and method for global and local power management has been herein described, wherein multiple logical processors may be operated at different pseudo power states within a global power state. It may be advantageous for the global power state to be the highest performance power state requested for all of the logical processors on a single physical processor, since that logical processor may require the global performance resources to be available at that global power state. Any other plurality of logical processors located on the same physical processor that are requested to operate at a lower performance power state may operate at any plurality of pseudo performance power states, which may save power, while allowing each logical processor to operate at a different power saving states. Therefore, with the apparatus and method herein described, the power states of and the performance levels of either a single or multiple processing elements may be dependencies between processing individually altered taking into account performance and power savings. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising: a physical processor including:
   a first processing element to receive a first power management request referencing a first power state and a second processing element to receive a second independent power management request referencing a second power management state; and
   a power module associated with the first and second processing elements to monitor said first and second independent power management requests, and in response to the first power management state being greater than the second power management state to:
     adjust a global resource shared by the first and the second processing element to a global level associated with the first power management state, and
     adjust a local resource associated with the second processing element to a pseudo power state level.

2. The apparatus of claim 1, wherein said first processing element is a first logical processor and said second processing element is a second logical processor.

3. The apparatus of claim 2, further comprising a fetch unit, a decode unit coupled to the fetch unit, an arithmetic logic unit coupled to the decode unit, and a floating point unit coupled to the decode unit, wherein said first and second logical processor's share access to the fetch, decode, arithmetic, and floating point units.

4. The apparatus of claim 2, wherein said first logical processor and said second logical processor are each selected from a group consisting of a core, a thread, and a processor.

5. The apparatus of claim 1, wherein said power module comprises logic with associated software.

6. The apparatus of claim 5, wherein said logic comprises a first register associated with the first processing element to hold a representation of the first power management request and a second register associated with the second processing element to hold a representation of the second independent power management request.

7. The apparatus of claim 5, wherein said logic comprises a device selected from the group of a programmable logic array (PLA), a programmable read-only memory (PROM), a read-only memory (ROM), and an Advanced Programmable Interrupt Controller (APIC).

8. The apparatus of claim 1, wherein said global resource shared by the first and the second processing element are selected from a group of global resources consisting of voltage and frequency.

9. The apparatus of claim 1, wherein said local resource is selected from a group of local resources consisting of instruction issue width, duty cycle, a size of a register renaming pool associated with said second processing element.

10. The apparatus of claim 1, wherein said power module intelligently selects the local resource to achieve the pseudo power state level for the second processing element without substantially affecting the global level of the first processing element.

11. An apparatus comprising: a microprocessor including:
    a first and second logical processor, wherein the first and second logical processor are capable of operating in a plurality of global power states; and
    power logic to receive a first power management request to request the first logical processor to enter a first global power state of the plurality of global power states and to receive a second power management request to request the second logical processor enter a second global power state of the plurality of global power states, wherein the power logic is to place the first logical processor in a first pseudo-power state within the second global power state in response to the first global power state being lower than the second global power state.

12. The apparatus of claim 11, wherein the power logic is to place the first and the second processing element in the first global power state in response to the first and the second global power states being the same.

13. The apparatus of claim 12, wherein the power logic is to place the first and the second logical processor in the first global power state and to place the second logical processor in a second pseudo power state in response to the first global power state being higher than the second global power state, and wherein the first pseudo power state is a pseudo power state within the second global power state and the second pseudo power state is a pseudo power state within the first global power state.

14. The apparatus of claim 13, wherein the power logic comprises a first register to hold a representation of the first global power state to be requested by the first power management request and a second register to hold a representation of the second global power state to be requested by the second power management request.

15. The apparatus of claim 14, wherein the first power management request is to be received after the second power management request, and wherein the power logic further comprises comparison logic to compare the first global power state, which is to be held in the first register, to the second global power state, which is to be held in the second register, to determine if the first global power state is (1) lower than the second global power state, (2) the same as the second global power state, or (3) higher than the second global power state.

16. The apparatus of claim 15, the first pseudo power state includes a first voltage and frequency associated with the second global power state and a first local resource, which is associated with the first logical processor, associated with the first pseudo power state, and wherein the second pseudo power state includes a second voltage and frequency associated with the first global power state and a second local resource, which is associated with the second logical processor, associated with the second pseudo power state.

17. The apparatus of claim 16, wherein the first and second local resource are each selected from a group consisting of instruction issue width, duty cycle, a size of a register renaming pool.

18. A method comprising:
receiving a power request to request a first processing element of a plurality of processing elements in a microprocessor to operate at a first requested global power state;
determining a highest global power state of the first requested global power state and a plurality of currently requested power states for each of the plurality of processing elements;
updating a global resource shared by the plurality of processing elements to a first resource level associated with the highest global power state; and
updating a local resource associated with the first processing element to a pseudo resource level in response to the first requested global power state being lower than the highest global power state.

19. The method of claim 18, further comprising: updating a second local resource associated with a second processing element of the plurality of processing elements to a second pseudo resource level in response to a second requested power state of the plurality of currently requested power states for the second processing element being lower than the highest global power state.

20. The method of claim 19, wherein the global resource is selected from a group consisting of frequency and voltage, and wherein the first local resource and the second local resource are each selected from a group consisting of an amount of instructions issued per clock cycle, a number of data operands operated on per clock cycle, and a number of registers available in a renaming pool.

21. The method of claim 18, further comprising: reading the plurality of currently requested power states for each of the plurality of processing elements from a plurality of registers, each of the plurality of registers corresponding to one of the plurality of processing elements, wherein each of the plurality of registers are to hold a currently requested power state for a corresponding processing element of the plurality of processing elements.

22. The method of claim 18, wherein the local resource is to be intelligently selected for the pseudo resource level to substantially emulate a power consumption of the first requested global power state in response to the global power state being lower than the highest global power state.

23. A system comprising:
a host processor coupled to the storage medium comprising a plurality of logical processors to execute code and to receive a plurality of power commands, each power command capable of independently requesting a power state change in at least one of the plurality of logical processors, and
a power module associated with the plurality of logical processors to
place the host processor in a highest global power state based on a highest power state currently requested for one of the plurality of processors, and
place one of the plurality of logical processors currently requested to be placed in a lower power state than the highest global power state in a pseudo power state within the highest global power state.

24. The system of claim 23, wherein the power module to place the host processor in a highest global power state based on a highest power state currently requested for one of the plurality of processors comprises adjusting a global resource of the host processor, which is shared by the plurality of logical processors, to a level associated with the highest power state, and wherein the power module to place one of the plurality of logical processors currently requested to be placed in a lower power state than the highest global power state in a pseudo power state of the highest global power state comprises: adjusting a local resource associated with the one of the plurality of logical processors to a pseudo power state level.

25. The system of claim 24, further comprising a memory coupled to the host processor to hold the code, wherein the code includes operating system code, and wherein the power module is included within the host processor.

* * * * *